B. L. ROWLEY.
Bridle-Bits.

No. 136,767.  Patented March 11, 1873.

Witnesses
Edmund Masson.
John R. Young

Inventor.
B. L. Rowley,
Prindle and Co., his Attys.

UNITED STATES PATENT OFFICE.

BURDETT L. ROWLEY, OF NEW BRITAIN, CONNECTICUT.

IMPROVEMENT IN BRIDLE-BITS.

Specification forming part of Letters Patent No. 136,767, dated March 11, 1873.

*To all whom it may concern:*

Be it known that I, BURDETT L. ROWLEY, of New Britain, in the county of Hartford and in the State of Connecticut, have invented certain new and useful Improvements in Bridle-Bits; and do hereby declare that the following is a full, clear, and exact description thereof, reference being had to the accompanying drawing making a part of this specification, in which—

Figure 1:
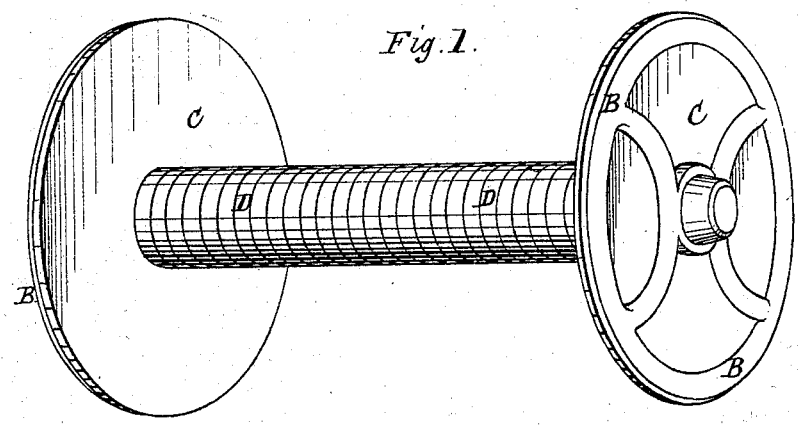
Figure 2:
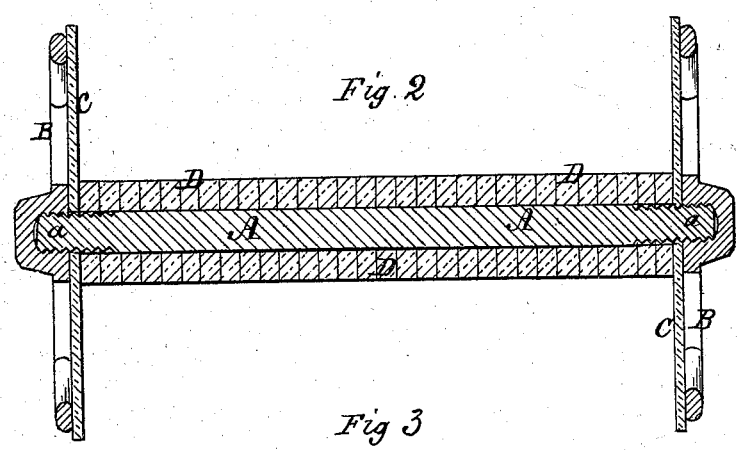
Figure 3:
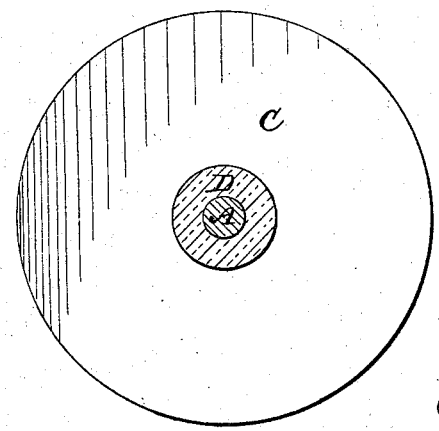

Figure 1 is a perspective view of my improved device. Fig. 2 is a central longitudinal section of the same, and Fig. 3 is a cross-section of said device.

Letters of like name and kind refer to like parts in each of the figures.

Among bits commonly used there are none against which some objections are not urged, either because of a want of durability or because of injury to the mouth of horses. To remove these objections is the design of my invention, which consists in a bridle-bit having the portion which is contained within the mouth of a horse covered with leather so arranged as to present the edge of its grain to the wear upon said part, substantially as and for the purpose hereinafter specified.

In the annexed drawing, A represents a round metal rod having a length about equal to the length of an ordinary bridle-bit, and provided upon its ends with a screw-thread, *a*, upon which are screwed two open-work metal cheek-pieces, B. Upon the rod A, immediately within the cheek-pieces B, are placed two correspondingly-shaped disks of leather, C, which form guards for the cheek-pieces, while between the latter are placed around or upon the bar A a series of small leather disks, D, which closely fill the space longitudinally, and together form a circular bar, which has any dimensions in cross-section deemed best.

The construction shown is, preferably, employed, although any other form or attachment for the cheek-pieces may be used, if desired.

The device thus constructed is used in the ordinary manner, and is found to possess the following-named advantages: First, the entire surface of the bit, which is brought into contact with the horse's mouth, is covered with a substance that does not produce corrosion or other injury to the skin, as in the use of rubber-covered bits. Second, as the leather covering is a non-conductor of heat or cold a horse will permit of its insertion into his mouth in the coldest of weather, when the insertion of a metal bit would be resisted because of its low temperature and unpleasant, if not injurious, effect upon the animal's mouth. Third, the wear comes upon the edge or end of the grain of the leather, instead, as in ordinary leather-covered bits, upon the side of the same, by which means far greater durability is secured; and, when worn out, the leather can be easily and quickly replaced at a very small cost. Fourth, by means of the peculiar shape and attachment of the leather covering no seam or other unsightly ridge is formed upon the bit; and consequently it is no more liable to injure the mouth of a horse than is a round metal bit. Fifth, while possessing the foregoing advantages the bit can be furnished at as low a cost as any now in market.

Having thus fully set forth the nature and merits of my invention, what I claim as new is—

A bridle-bit having the portion which is contained within the mouth of a horse covered with leather that is arranged with the edge of its grain to the wear upon said part, substantially as and for the purpose specified.

In testimony that I claim the foregoing I have hereunto set my hand this 5th day of October, 1872.

BURDETT L. ROWLEY.

Witnesses:
   GEO. S. PRINDLE,
   JOHN R. YOUNG.